United States Patent
Wu et al.

(10) Patent No.: US 8,072,187 B2
(45) Date of Patent: Dec. 6, 2011

(54) BATTERY-CHARGING DEVICE FOR A STAND-ALONE GENERATOR SYSTEM HAVING A MPPT FUNCTION AND METHOD THEREOF

(75) Inventors: Kuen-Der Wu, Kaohsiung (TW); Hung-Yuan Tai, Kaohsiung (TW); Jie-Tin Lee, Kaohsiung (TW); Chang-Chu Wu, Kaohsiung (TW); Ya-Tsung Feng, Kaohsiung (TW)

(73) Assignee: Ablerex Electronics Co., Ltd., Taipei Hsien (TW)

( * ) Notice: Subject to any disclaimer, the term of this patent is extended or adjusted under 35 U.S.C. 154(b) by 522 days.

(21) Appl. No.: 12/273,669

(22) Filed: Nov. 19, 2008

(65) Prior Publication Data

US 2010/0123428 A1 May 20, 2010

(51) Int. Cl.
*H02J 7/04* (2006.01)
*H02J 7/34* (2006.01)
*H02J 1/12* (2006.01)
*H02P 7/29* (2006.01)
*H01M 10/44* (2006.01)

(52) U.S. Cl. .......... 320/140; 320/102; 388/819; 307/46; 307/49

(58) Field of Classification Search .......... 320/140, 320/102
See application file for complete search history.

(56) References Cited

U.S. PATENT DOCUMENTS

| 5,479,557 | A * | 12/1995 | Ganz et al. | 388/829 |
| 6,914,418 | B2 * | 7/2005 | Sung | 320/140 |
| 7,324,361 | B2 * | 1/2008 | Siri | 363/95 |
| 2004/0174939 | A1 | 9/2004 | Wang | |
| 2005/0110454 | A1 * | 5/2005 | Tsai et al. | 320/101 |

FOREIGN PATENT DOCUMENTS

| TW | 566745 | 12/2003 |
| TW | 200825278 | 6/2008 |

* cited by examiner

*Primary Examiner* — M'Baye Diao
(74) *Attorney, Agent, or Firm* — Alan Kamrath; Kamrath & Associates PA (57) ABSTRACT

A battery-charging device, having a maximum power point tracking (MPPT) function, for a stand-alone generator system includes a DC/DC power converter and a control circuit used to control the DC/DC power converter. The method applied in the device includes: performing a MPPT function to supply a continuous current when the electric power generated from the electrical power source of the stand-alone generator system is low; operating a pulse charging function and continuing the MPPT function when the electric power generated from the electrical power source of the stand-alone generator system is high and not greater than the summation of the load power and a maximum charging power of the pulse charging method for the battery; terminating the MPPT function while the electric power is greater than the summation of the load power and the maximum charging power of the pulse charging method for the battery; and operating a constant-voltage charging mode when the battery voltage is greater than a predetermined constant charging voltage.

14 Claims, 5 Drawing Sheets

BATTERY-CHARGING DEVICE FOR A STAND-ALONE GENERATOR SYSTEM HAVING A MPPT FUNCTION AND METHOD THEREOF

BACKGROUND OF THE INVENTION

1. Field of the Invention

The present invention relates to a battery-charging device for a stand-alone generator system having a MPPT (maximum power point tracking) function and a method thereof. Particularly, the present invention relates to the battery-charging device and the method thereof applied to electrical generation equipment of wind energy, solar energy or other renewable energy, with the battery-charging device including a DC/DC converter and a control circuit. More particularly, the present invention relates to the control circuit of the battery-charging device provided with four operation modes, with one of the operation modes selected and actuated by the output of wind energy or solar energy power and the state-of-health of batteries so as to increase the utilization of wind energy and solar energy.

2. Description of the Related Art

A conventional small stand-alone wind energy or solar energy generator system directly supplies to loads, and any redundant electric power will charge batteries for storing energy. The batteries will supply electric power to the load when the electric power supplied from the generator system cannot satisfy the power demanded by the load. Generally, such a stand-alone generator system is only designed with small-capacity equipment and is suitable for remote areas where no utility power can arrive. The stand-alone generator system is frequently used in the environment with a shortage of an electric power resource. Hence, there is a need for increasing a ratio of energy utilization of such a stand-alone generator system.

In some circumstances, the electric power supplied from the stand-alone generator system of wind energy or solar energy is lower than that required by loads. Accordingly, the stand-alone generator system of wind energy or solar energy is equipped with batteries and a battery-charging device. In order to effectively utilize the electric power stored in batteries of the stand-alone generator system, the power generated from the stand-alone generator system must rapidly charge the batteries which can perform as an electric power source of loads. Disadvantageously, rapidly improper charging may cause damage to batteries and may shorten the life of the battery.

There are several major battery-charging methods including: a constant current charging method, a constant voltage charging method, a hybrid constant current/constant voltage charging method and a pulse current charging method.

Each of the above-mentioned charging methods has several advantages and drawbacks. For instance, the constant current charging method has a drawback of overcharge occurrence when the battery voltage is high. In addition, the constant voltage charging method has a drawback of causing a large charging current, when the battery voltage is low, thus damaging the battery. The hybrid constant current/constant voltage charging method can improve the drawback of a large charging current when the battery voltage is low. However, such a charging method requires a longer charging time. As to the pulse current charging method, damages to the battery may be relatively small.

In general, a conventional battery-charging method of the stand-alone generator system (for example: a wind energy or solar energy power generator system) having a MPPT function utilizes the two-stage constant current/constant voltage charging method, namely the hybrid constant current/constant voltage charging method. When the power generated by the electric power generator system is lower than the summation of the load power and the maximum charging power (Pb) of the constant current charging method for a battery, the generator system is operated in a MPPT mode. Conversely, when the power generated by the electric power generator system is higher than the summation of the load power and the maximum charging power (Pb) of the constant current charging method for a battery, the power generated by the electric power generator system is limited to be the summation of the load power and the maximum charging power (Pb) of the constant current charging method for a battery to avoid the high charging current damaging the battery. In this circumstance, the MPPT function of the generator system is terminated, so that the electric power generator system cannot supply the maximum electric power and the redundant electric power cannot be effectively utilized.

Figure 1:
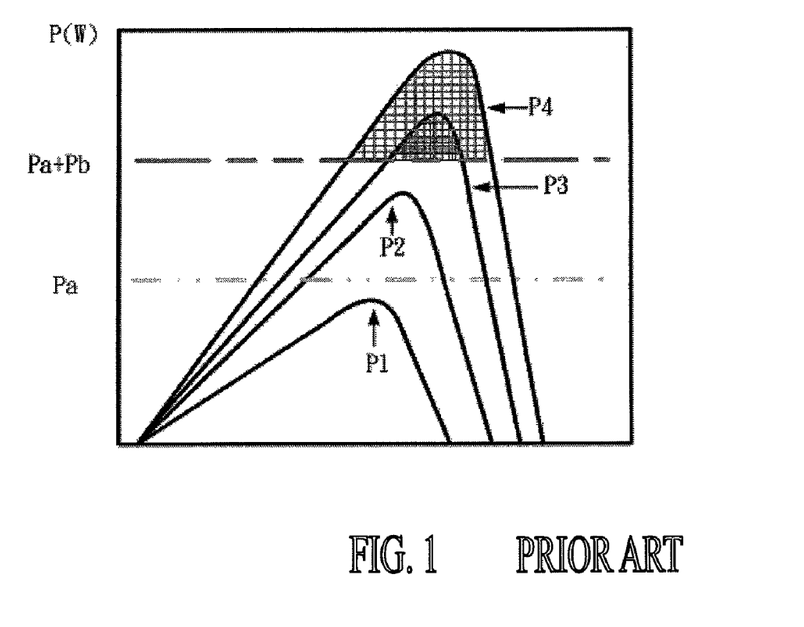
FIG. 1 is a curve diagram of an output power of a conventional stand-alone generator system having a MPPT function.

Referring initially to FIG. 1, a curve diagram of an output electric power P(W) of a conventional stand-alone generator system having a MPPT function is shown. When the stand-alone generator system is a solar energy power generator system, curves P1, P2, P3, P4, as shown in FIG. 1, represent the output power of the solar energy generator system in relation to its output voltages under various solar illuminations. The curve P4 represents the output power of the solar energy generator system under a maximum solar illumination, while the curve P1 represents the output power of the solar energy generator system under a minimum solar illumination. When the stand-alone generator system is a wind energy generator system, curves P1, P2, P3, P4 represent the output power of the wind energy generator system in relation to its rotational speeds under various wind speeds. The curve P4 represents the output power of the wind energy generator system under a maximum wind speed, while the curve P1 represents the output power of the wind energy generator system under a minimum wind speed. With continued reference to FIG. 1, when maximum power sections of the curves P3 and P4 are greater than the summation of the load power and the maximum charging power (Pb) of the constant current charging method for a battery, the power generated by the electric power generator system is limited to be the summation of the load power and the maximum charging power (Pb) of the constant current charging method for a battery. Disadvantageously, the output electric power generated by the electrical power source, as best shown in a meshed area in FIG. 1, cannot be effectively utilized while located in a maximum power area (i.e. the redundant electric power area) of the curves P3 and P4.

Another conventional solar energy pulse battery-charging device, as described in Taiwanese Patent Publication No. 566745, has a battery-charging method similar to the above-mentioned method. Another conventional charging method of a battery-charging device having a MPPT function, as described in U.S. Patent Publication No. 2004/0174939, discloses a constant voltage generated from solar power energy to supply a battery and loads via a battery-charging device. The battery-charging device can be controlled to execute the MPPT function if the output power of the battery-charging device is less than the summation of the load power and the battery-charging power. Conversely, if the output power of the solar energy generator system is greater than the summation of the load power and the battery-charging power, the battery-charging device is controlled to terminate the MPPT function and to set the output power of the solar energy generator system equal to the summation of load power and battery-charging power so as to maintain outputting a constant voltage. In this manner, such a battery-charging method is a constant voltage charging method.

The battery-charging device of U.S. Patent Pub. No. 2004/0174939 is successful in outputting a stable constant voltage, avoiding the damage of severe voltage variation to loads and simplifying the entire structure. However, the difference between the battery voltage and the output voltage of the battery-charging device is large when the battery is situated in low stored energy, and it may cause an overcharging current if the battery-charging device is operated in a constant voltage charging mode. Disadvantageously, the overcharging current may not only shorten the life of battery but also may damage the battery-charging device. Briefly, there is a need for improving the battery-charging method applied in U.S. Patent Pub. No. 2004/0174939 so as to avoid damaging the battery-charging device and the battery. In addition, there is a need for improving problematic aspects while incorporating the MPPT function with other battery-charging methods.

Taiwanese patent publication No. 200825278 discloses a battery-charging method of a wind energy generator system having a MPPT function. However, such a battery-charging method requires utilizing a DC/DC converter and a pulse control (pulse generating) circuit and includes five operation modes of the battery-charging device. Disadvantageously, the circuit hardware and the control method applied therein are complicated.

As is described in greater detail below, the present invention provides a battery-charging device for a stand-alone generator system having a MPPT function. The battery-charging device includes a DC/DC converter and a control circuit. The control circuit is used to control the DC/DC converter performing four operation modes. When a generated output power of the electrical power source of the stand-alone generator system is low, the battery-charging device is operated in the MPPT function and provides a continuous charging current. If the generated output power of the electrical power source of the stand-alone generator system is lower than the load power, the electrical power source and the battery supply electric power to the load together. If the battery voltage is lower than a predetermined discharging voltage, the load is cut off. When the generated output power of the electrical power source of the stand-alone generator system is greater than the summation of the load power and the maximum charging power of the constant current charging method for the battery, the battery-charging device is switched and operated in a pulse charging method. In this manner, the battery-charging device is still controlled to execute the MPPT function if the generated output power of the electrical power source of the stand-alone generator system is not greater than the summation of the load power and a maximum charging power of the pulse charging method for the battery. The MPPT function is terminated if the generated output power of the electrical power source of the stand-alone generator system is greater than the summation of the load power and the maximum charging power of the pulse charging method for the battery. The battery-charging device is switched and operated by a constant voltage charging method if the battery voltage is greater than a predetermined constant charging voltage. Accordingly, the utilized generated output power of the electrical power source of the stand-alone generator system of the present invention can be effectively increased.

SUMMARY OF THE INVENTION

The primary objective of this invention is to provide a battery-charging device for a stand-alone generator system having a MPPT function. The battery-charging device includes a DC/DC converter and a control circuit. The control circuit is used to control the DC/DC converter performing four operation modes. The operation modes include a MPPT function, a pulse charging function, a constant voltage charging function and combinations thereof so as to simplify the entire structure of the hardware circuit and battery-charging modes.

Another objective of this invention is to provide a battery-charging method for a stand-alone generator system having a MPPT function. When a generated output power of the electrical power source of the stand-alone generator system is low, the battery-charging device is operated with the MPPT function and provides a continuous charging current. When the output power of the stand-alone generator system is greater, the battery-charging device is switched and operated with a pulse charging method. In this manner, the battery-charging device is still controlled to execute the MPPT function if the generated output power of the electrical power source of the stand-alone generator system is not greater than the summation of the load power and a maximum charging power of the pulse charging method for the battery. The MPPT function is terminated if the generated output power of the electrical power source of the stand-alone generator system is greater than the summation of the load power and the maximum charging power of the pulse charging method for the battery. The battery-charging device is switched and operated with a constant voltage charging method if the battery voltage is greater than a predetermined constant charging voltage.

Another objective of this invention is to provide the battery-charging method for a stand-alone generator system having a MPPT function. The battery-charging method provides four operation modes. When a generated output power of the electrical power source of the stand-alone generator system is low, the battery-charging device is operated with the MPPT function and provides a continuous charging current. If the generated output power of the electrical power source of the stand-alone generator system is lower than the load power, the stand-alone generator system and the battery supply electric power to the load together. If the battery voltage is lower than a predetermined discharging voltage, the load is cut off. When the generated output power of the electrical power source of the stand-alone generator system is greater than the summation of the load power and the maximum charging power of the constant current charging method for the battery, the battery-charging device is switched and operated with a pulse charging method. In this manner, the battery-charging device is still controlled to execute the MPPT function if the generated output power of the electrical power source of the stand-alone generator system is not greater than the summation of the load power and a maximum charging power of the pulse charging method for the battery. The MPPT function is terminated if the generated output power of the electrical power source of the stand-alone generator system is greater than the summation of the load power and the maximum charging power of the pulse charging method for the battery. The battery-charging device is switched and operated as a constant voltage charging method so as to avoid overcharge if the battery voltage is greater than a predetermined constant charging voltage. Accordingly, the utilized generated output power of the electrical power source of the stand-alone generator system of the present invention can be effectively increased.

The battery-charging device for a stand-alone generator system having a MPPT function in accordance with an aspect of the present invention includes a DC/DC converter and a control circuit. The battery-charging method includes:

the control circuit controlling the DC/DC converter being operated with the MPPT function and providing a continuous charging current when a generated output power of the electrical power source of the stand-alone generator system is low, the stand-alone generator system and the battery supplying an electric power to the load together if the generated output power of the electrical power source of the stand-alone generator system is lower than a load power, with the control circuit controlling a switch to cut off the load if the battery voltage is lower than a predetermined discharging voltage;

the control circuit controlling the DC/DC converter being operated in a pulse charging method when the generated output power of the electrical power source of the stand-alone generator system is greater than the summation of the load power and the maximum charging power of the constant current charging method for the battery, with the DC/DC converter being controlled to execute the MPPT function if the generated output power of the electrical power source of the stand-alone generator system is not greater than the summation of the load power and a maximum charging power of the pulse charging method for the battery;

the control circuit controlling the DC/DC converter to terminate the MPPT function if the generated output power of electrical power source of the stand-alone generator system is greater than the summation of the load power and the maximum charging power of the pulse charging method for the battery, with the control circuit further controlling the DC/DC converter being operated to maintain at the predetermined maximum pulse charging power to charge the battery; and the control circuit controlling the DC/DC converter being operated as constant voltage charging if the battery voltage is greater than a predetermined constant charging voltage.

The battery-charging method of the present invention utilizes the DC/DC converter and the control circuit to select the MPPT function, the pulse charging function, the constant voltage charging function or combinations thereof so as to increase the utilized output power of the stand-alone generator system.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Throughout the specification, the terms "battery-charging device" and "battery-charging method," as used herein, are applied to a stand-alone generator system having a MPPT function for use in electric power generated by wind energy, solar energy or other renewable energy which are not limitative of the present invention. The term "battery," as used herein, will be understood to imply the inclusion of a battery unit or a battery set.

Figure 2:
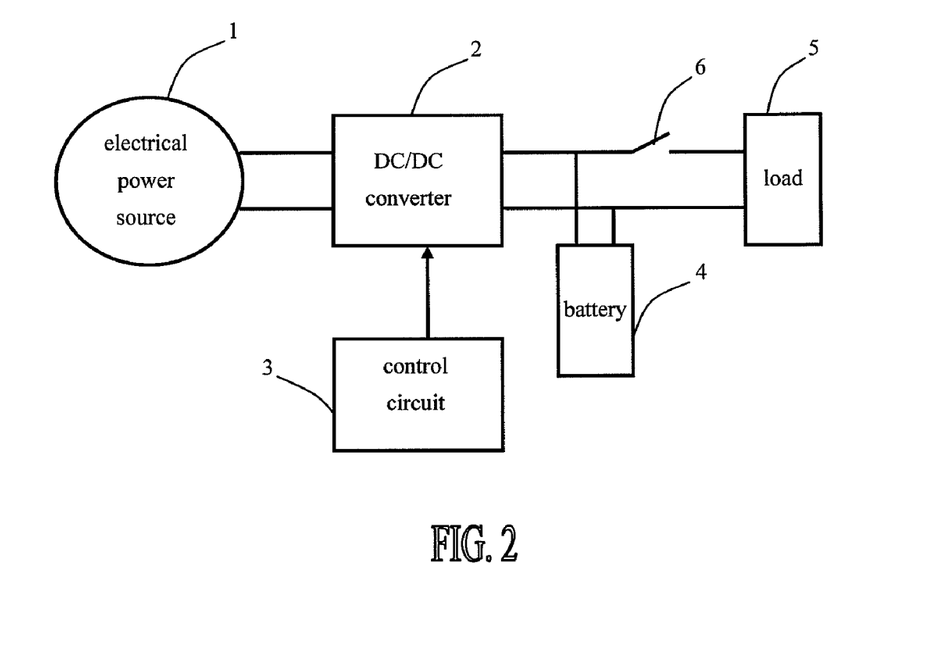
FIG. 2 is a schematic view of a battery-charging device for a stand-alone generator system having a MPPT function in accordance with the preferred embodiment of the present invention.

Referring now to FIG. 2, a battery-charging device for a stand-alone generator system having a MPPT function in accordance with the preferred embodiment of the present invention includes an electrical power source 1, a DC/DC converter 2, a control circuit 3, a battery 4 and a switch 6. The electrical power source 1 is used to supply a DC power and is selected from a solar cell array or a wind power generator system provided with a rectified circuit. An input of the DC/DC converter 2 electrically connects with an output of the electrical power source 1, and an output of the DC/DC converter 2 electrically connects with the battery 4 in parallel. The battery 4 electrically connects with a load 5 via the switch 6 and supplies electric power thereto. The control circuit 3 electrically connects with and controls the DC/DC converter 2 such that the DC/DC converter 2 can perform functions of MPPT, pulse charging and constant voltage charging. According to the output power of the electrical power source 1 of the stand-alone generator system and the state of health of the battery 4, the control circuit 3 can control the DC/DC converter 2 to be selectively operated in the MPPT function, the pulse charging function, the constant voltage charging function or combinations thereof. Consequently, the utilized output power of the stand-alone generator system of the present invention can effectively increase.

The battery 4 is used to store electric power generated by the electrical power source 1 or to supply the electric power to the load 5 via the switch 6. When the generated output power of the electrical power source 1 is low, the control circuit 3 controls the DC/DC converter 2 to perform the MPPT function to utilize the maximum power generated from the electrical power source 1. While performing the MPPT function, the battery-charging device provides a continuous charging current, and the charging power to the battery 4 is a difference between the maximum power of the electrical power source 1 and the power supplied to the load 5. If the generated output power of the electrical power source 1 is lower than the power of the load 5, the electrical power source 1 and the battery 4 supply electric power to the load 5 together. If a voltage of the battery 4 is lower than a predetermined discharging voltage, the switch 6 is opened to cut off the load 5. When the generated output power of the electrical power source 1 is greater than the summation of the load power and a maximum charging power of the constant current charging method for the battery 4, the control circuit 3 controls the DC/DC converter 2 to execute the pulse charging function. In this manner, the MPPT function is still executed if the generated output power of the electrical power source 1 is not greater than the summation of the load power and a maximum charging power of the pulse charging method for the battery 4. Otherwise, the control circuit controls the DC/DC converter 2 to terminate the MPPT function if the generated output power of the electrical power source 1 is greater than the summation of the load power and the maximum charging power of the pulse charging method for the battery 4. In this circumstance, the control circuit 3 controls the DC/DC converter 2 being operated to maintain at the predetermined maximum pulse charging power to charge the battery 4. The control circuit 3 continuously controls the DC/DC converter 2 to perform the pulse charging function to charge the battery 4 in the pulse charging manner. If the voltage of the battery 4 is greater than a predetermined constant charging voltage, the control circuit 3 controls the DC/DC converter 2 to perform the constant voltage charging function to charge the battery 4.

Figure 2A:
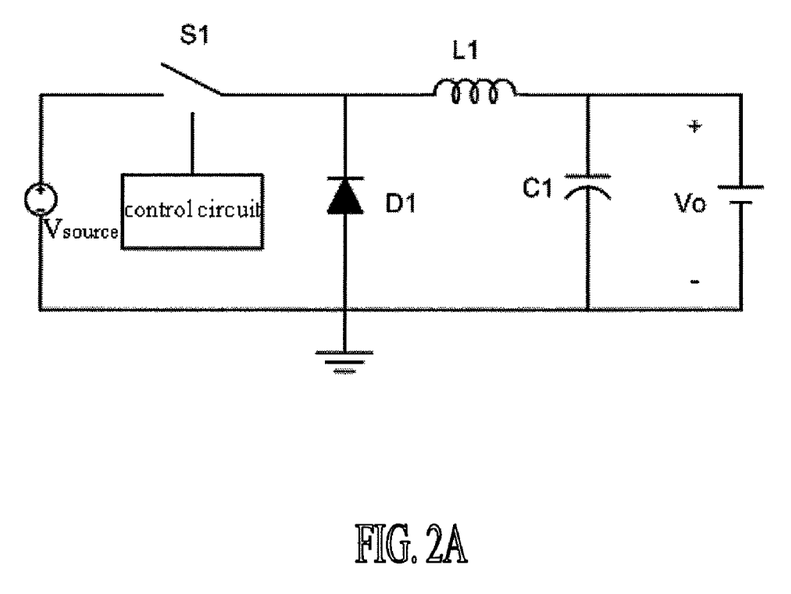
FIGS. 2A-2C are schematic views of DC/DC converters applied in the battery-charging device for the stand-alone generator system in accordance with the preferred embodiment of the present invention.
Figure 2B:
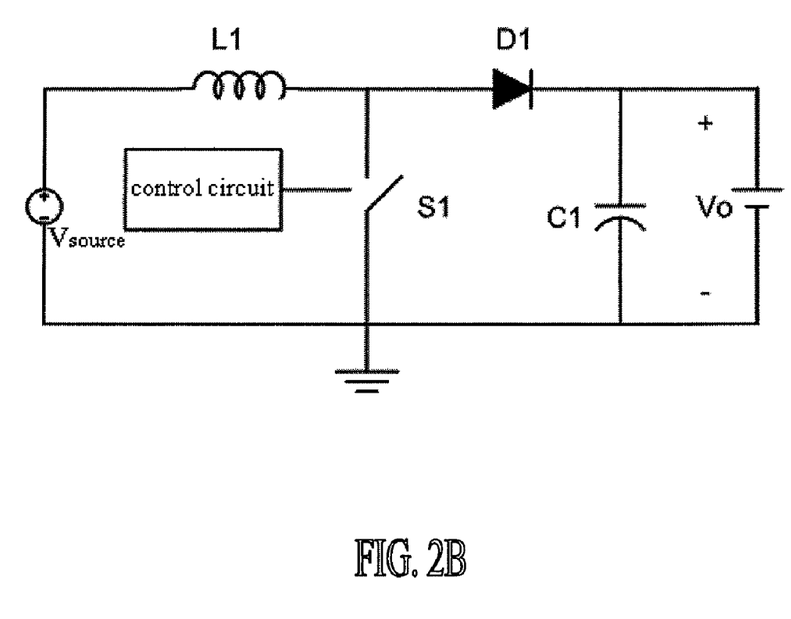
Figure 2C:
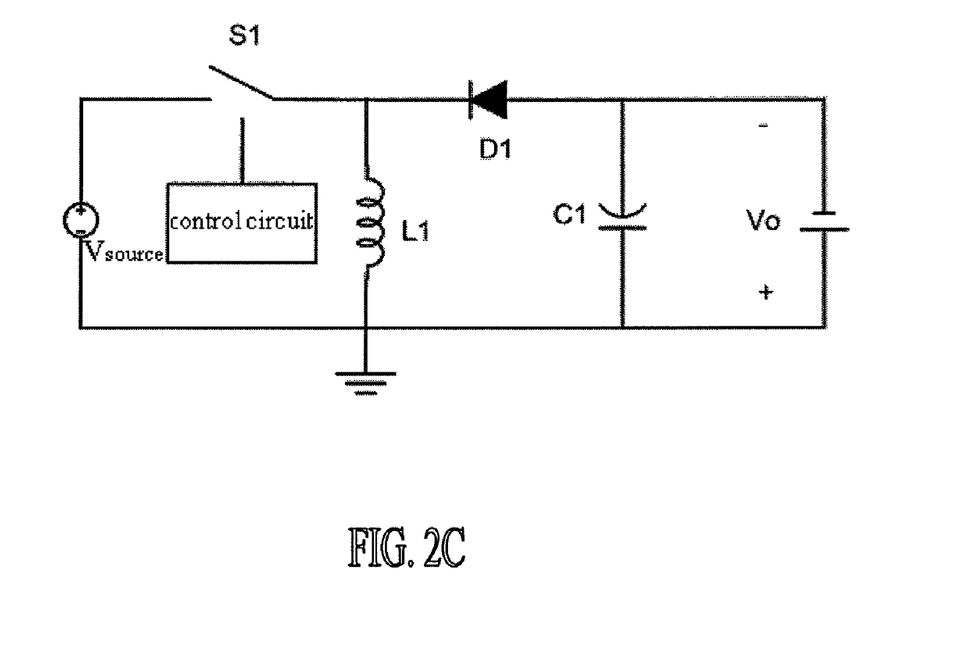

Turning now to FIGS. 2A-2C, the DC/DC converter 2 for use in the battery-charging device of the preferred embodiment of the present invention can be selected from a non-isolated DC/DC converter, including a buck converter shown in FIG. 2A, a boost converter shown in FIG. 2B and a buck-boost converter shown in FIG. 2C, which are not limitative of the present invention. The structures of the buck converter, the boost converter and the buck-boost converter are well known in the art, and the detailed descriptions of the structures are omitted. The control circuit 3 controls the power electronic switch components of the DC/DC converter 2 (e.g. buck converter, boost converter or buck-boost converter) in executing the MPPT function, the pulse charging function, the constant voltage charging function or combinations thereof.

Figure 3:
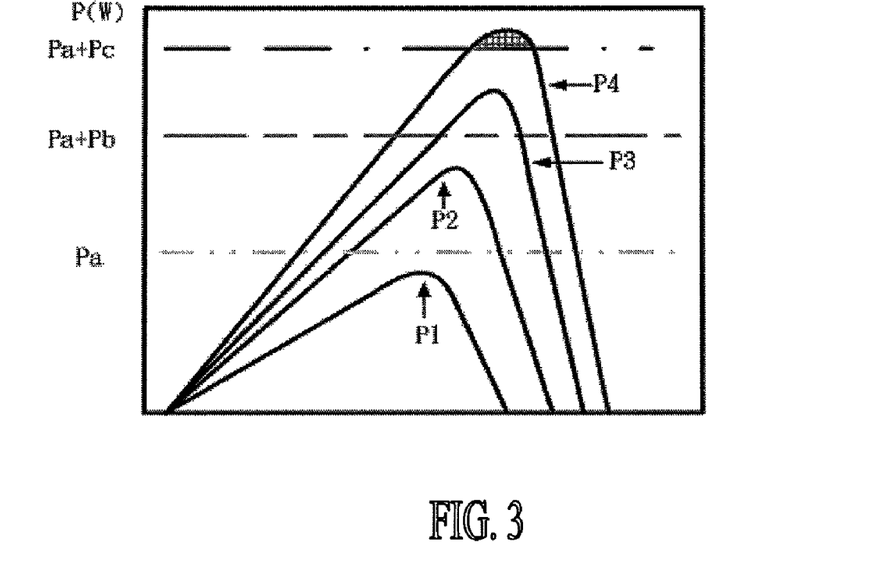
FIG. 3 is a curve diagram of an output power of the stand-alone generator system having the MPPT function in accordance with the preferred embodiment of the present invention.

Turning now to FIG. 3, four curves of the output power P(W) of the electrical power source 1 are shown. Referring to FIGS. 2 and 3, when the electrical power source 1 is a solar energy power generator system, curves P1, P2, P3, P4, as shown in FIG. 3, represent generated output power of the solar power energy generator system in relation to its output voltages under various solar illuminations. The curve P4 represents the generated output power of the solar energy power generator system under a maximum solar illumination, while the curve P1 represents the generated output power of the solar energy power generator system under a minimum solar illumination. When the electrical power source 1 is a wind energy generator system, curves P1, P2, P3, P4 represent output power of the wind energy generator system in relation to its rotational speeds under various wind speeds. The curve P4 represents the output power of the wind energy generator system under a maximum wind speed, while the curve P1 represents the output power of the wind energy generator system under a minimum wind speed.

In FIG. 3, a first power limit, a second power limit and a third power limit are identified, respectively, where: Pa represents the first power limit which has a value identical with a load power, Pa+Pb represents the second power limit which is a maximum charging power of the constant current charging method for the battery 4, and Pa+Pc represents the third power limit which is a maximum charging power of the pulse charging method for the battery 4; wherein the third power limit Pa+Pc is greater than the second power limit Pa+Pb. Referring again to FIGS. 2 and 3, the DC/DC converter 2 is controlled to terminate the MPPT function while the electric power generated from the electrical power source 1 is greater than the third power limit Pa+Pc, and is located in a maximum power area (i.e. redundant electric power area), as best shown in a meshed area in FIG. 3, of the curve P4 which is caused by a highest degree of illumination or a highest wind speed. In this circumstance, the redundant electric power cannot be effectively utilized. Referring back to FIGS. 1 and 3, the ineffectively utilized electric power area shown in FIG. 3 is smaller that shown in FIG. 1. In comparison with the conventional battery-charging method, the electric power effectively utilized by the battery-charging method of the present invention is greater than that by the conventional battery-charging method. Thus, the battery-charging method of the present invention can effectively enhance the battery-charging speed and shorten the battery-charging time.

Referring again to FIGS. 2 and 3, the battery-charging device for a stand-alone generator system in accordance with the preferred embodiment of the present invention provides four operation modes, including a first operation mode, a second operation mode, a third operation mode and a fourth operation mode, for executing the MPPT function, the pulse charging function, the constant voltage charging function or combinations thereof. The first operation mode is executed when the generated output power of the electrical power source 1 is greater than or equal to the first power limit Pa but less than the second power limit Pa+Pb. The control circuit 3 controls the DC/DC converter 2 to perform the MPPT function to utilize the maximum power supplied from the electrical power source 1. The switch 6 is closed to supply power to the load 5. The charging power to the battery 4 is a difference between the maximum power of the electrical power source 1 and the power supplied to the load 5 and is a continuous charging current. If the generated output power of the electrical power source 1 is lower than the first power limit Pa, the control circuit 3 controls the DC/DC converter 2 to execute the MPPT function, and the electrical power source 1 and the battery 4 supply electric power to the load 5 together. If the voltage of the battery 4 is lower than a predetermined minimum discharging voltage, the switch 6 is opened to cut off the load 5 to avoid over-discharging of the battery 4. In a preferred embodiment, the predetermined minimum discharging voltage of the battery 4 is identical with a value of minimum discharging voltage suggested by battery manufacturers. After cutting off the load 5, the generated output power of the electrical power source 1 is still charging the battery 4.

With continued reference to FIGS. 2 and 3, the second operation mode is executed when the generated output power of the electrical power source 1 is greater than the second power limit Pa+Pb but less than the third power limit Pa+Pc. The continuous current, however, is no longer suitable for charging the battery 4. In the second operation mode, the control circuit 3 controls the DC/DC converter 2 to execute the pulse charging function and to continue the MPPT function to utilize the maximum output power of the electrical power source 1. In this circumstance, the switch 6 is closed to supply electric power to the load 5.

With continued reference to FIGS. 2 and 3, the third operation mode is executed if the generated output power of the electrical power source 1 is greater than the third power limit Pa+Pc. The MPPT function, however, is no longer executed. Otherwise, such a battery charging executed in the MPPT function will overheat the battery 4 and will result in shortening the battery's life. In the third operation mode, the control circuit 3 controls the DC/DC converter 2 to terminate the MPPT function and to limit the output power of the electrical power source 1 at the summation of the power of the load 5 and the maximum charging power of the pulse charging method for the battery 4. In this circumstance, the control circuit 3 controls the DC/DC converter 2 for continuously performing the pulse charging function to charge the battery 4. In this circumstance, the switch 6 is closed to supply the electric power to the load 5.

Still referring to FIG. 2, the fourth operation mode is executed, when the voltage of the battery 4 is greater than a predetermined constant charging voltage (A1). Neither the continuous current charging function nor the pulse charging function is suitable for charging the battery 4. Otherwise, it will overheat the battery 4 and will result in shortening the life of the battery. In the fourth operation mode, the control circuit 3 controls the DC/DC converter 2 to perform the constant voltage charging function to charge the battery 4 under a constant voltage. In a preferred embodiment, the predetermined constant charging voltage (A1) is obtained from a value suggested by battery manufacturers. In this circumstance, the switch 6 is closed to supply electric power to the load 5.

Figure 4:
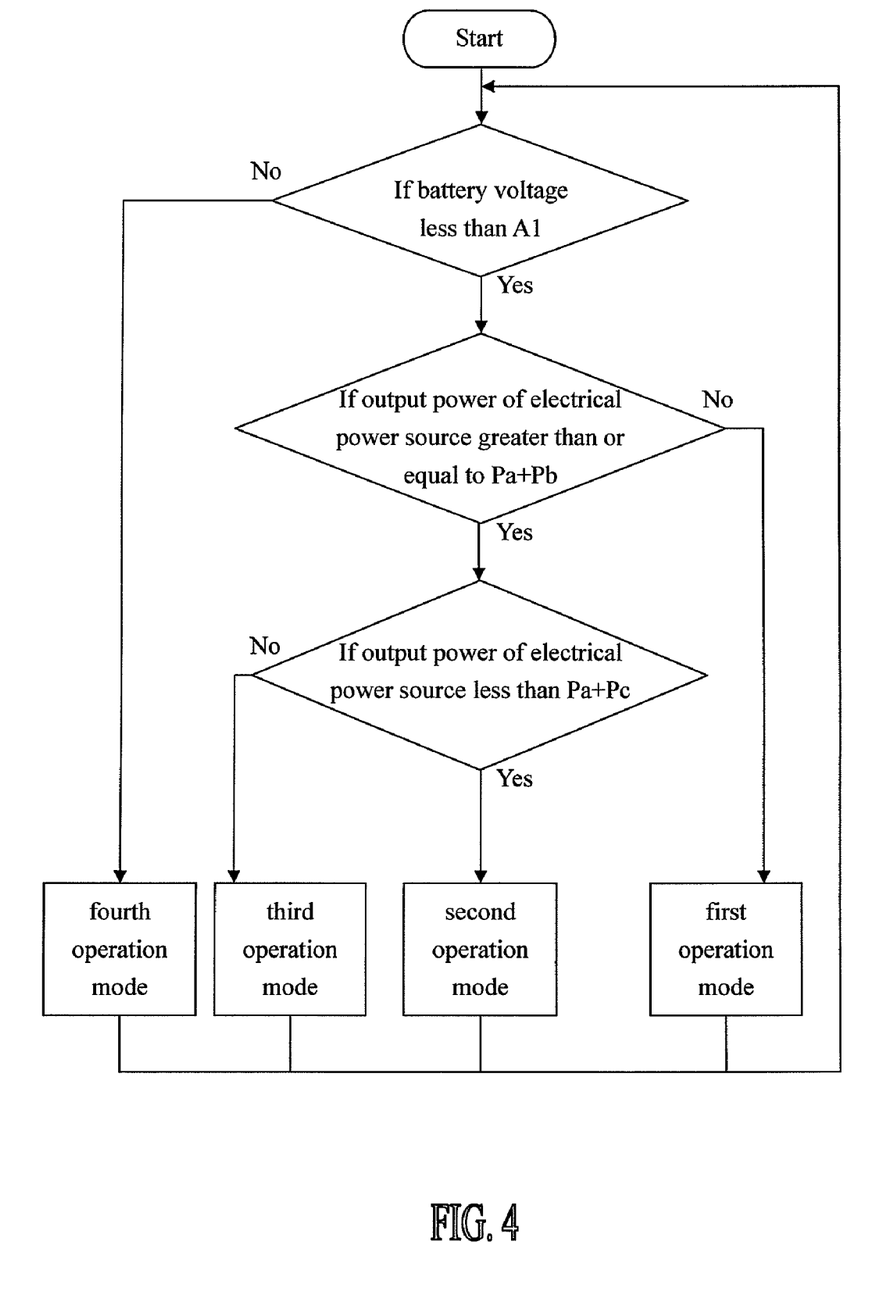
FIG. 4 is a flow chart of a battery-charging method for the stand-alone generator system having the MPPT function in accordance with the preferred embodiment of the present invention.

Turning now to FIG. 4, a flow chart of a battery-charging method for the stand-alone generator system in accordance with the preferred embodiment of the present invention is shown. Referring to FIGS. 2 and 4, the battery-charging method includes the step of judging whether the voltage of the battery 4 is less than the predetermined constant charging voltage (A1). If the voltage of the battery 4 is not less than the predetermined constant charging voltage (A1), the fourth operation mode is directly executed and the control circuit 3 controls the DC/DC converter 2 to perform the constant voltage charging function to charge the battery 4 by the constant voltage. Conversely, if the voltage of the battery 4 is less than the predetermined constant charging voltage (A1), one of the first operation mode, the second operation mode and the third operation mode is selectively executed.

When the voltage of the battery 4 is less than the predetermined constant charging voltage (A1), there is a step of judging whether the generated output power of the electrical power source 1 is less than the second power limit Pa+Pb. If the generated output power of the electrical power source 1 is less than the second power limit Pa+Pb, the first operation mode is executed, and the control circuit 3 controls the DC/DC converter 2 to perform the MPPT function to utilize the maximum power generated from the electrical power source 1. In this circumstance, the switch 6 is closed to supply electric power to the load 5. The charging power to the battery 4 is a difference between the maximum power of the electrical power source 1 and the power supplied to the load 5, and the charging current is a continuous charging current. If the generated output power of the electrical power source 1 is less than the first power limit Pa, the battery 4 is controlled to discharge, such that the electrical power source 1 and the battery 4 supply electric power to the load 5 together. In addition, the first operation mode requires judging whether the voltage of the battery 4 is less than the predetermined minimum discharging voltage. If the voltage of the battery 4 is less than the predetermined minimum discharging voltage, the switch 6 is opened to cut off the load 5 to avoid overdischarging of the battery 4 which is continuously charged by the output power of the electrical power source 1.

Subsequently, if the generated output power of the electrical power source 1 is greater than or equal to the second power limit Pa+Pb, there is a step of: judging whether the generated output power of the electrical power source 1 is less than the third power limit Pa+Pc.

If the generated output power of the electrical power source 1 is less than the third power limit Pa+Pc, the second operation mode is executed and the control circuit 3 controls the DC/DC converter 2 to perform the pulse charging function and the MPPT function to utilize the maximum power generated from the electrical power source 1. In this circumstance, the switch 6 is closed to supply the electric power to the load 5.

Conversely, if the generated output power of the electrical power source 1 is greater than or equal to the third power limit Pa+Pc, the third operation mode is executed, and the control circuit 3 controls the DC/DC converter 2 to terminate the MPPT function and to limit the output power of the electrical power source 1 at the summation of the power of the load 5 and the maximum charging power of the pulse charging method for the battery 4. In this circumstance, the control circuit 3 controls the DC/DC converter 2 for continuously performing the pulse charging function to charge the battery 4. In this circumstance, the switch 6 is closed to supply electric power to the load 5.

After executing one of the first operation mode, the second operation mode, the third operation mode and the fourth operation mode, there is a returning step of: repeatedly judging whether the voltage of the battery 4 is less than the predetermined constant charging voltage (A1) to reselect one of the first operation mode, the second operation mode, the third operation mode and the fourth operation mode, if necessary.

Figure 5:
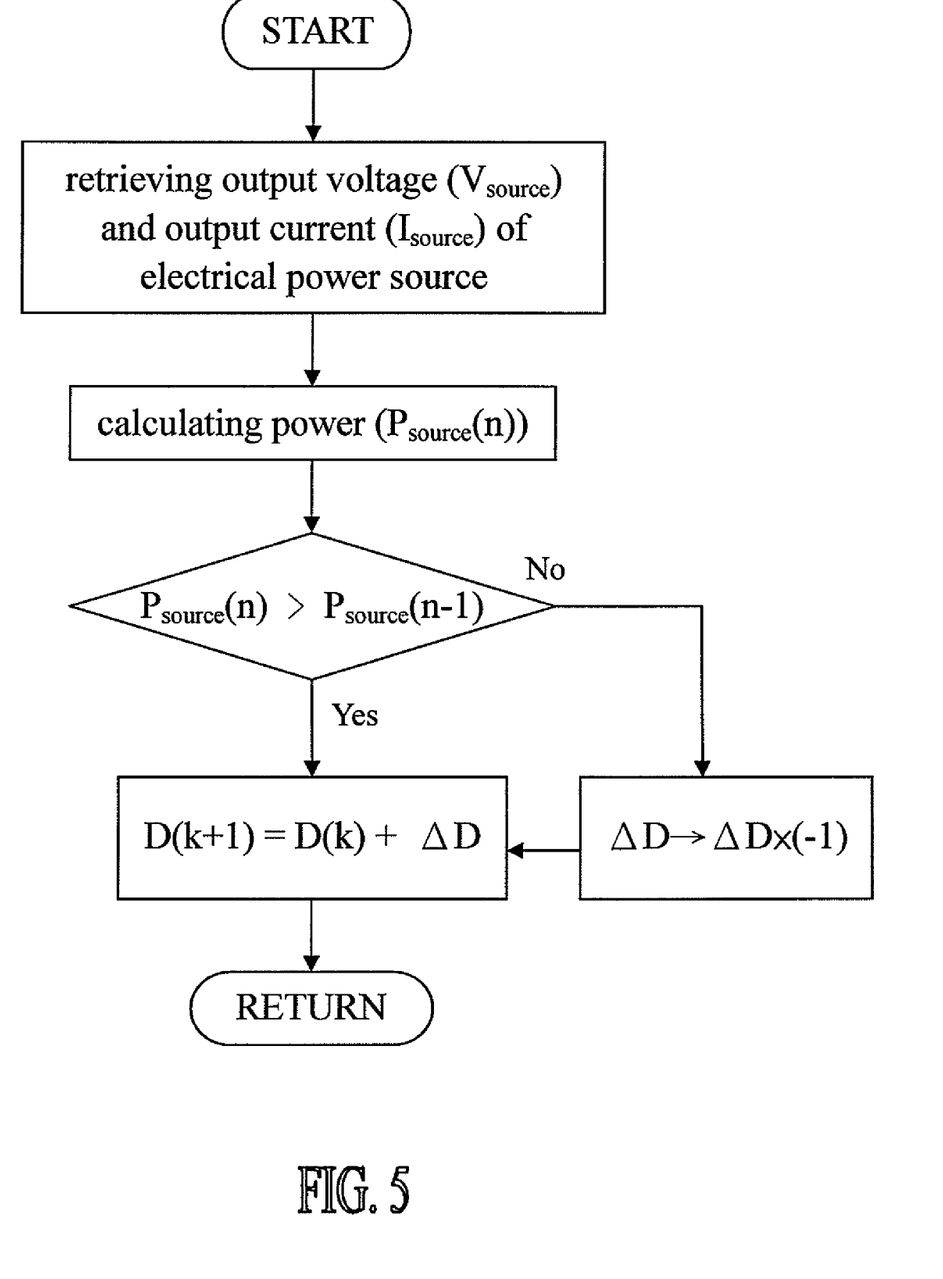
FIG. 5 is a flow chart of a MPPT method applied in the battery-charging device for the stand-alone generator system in accordance with the preferred embodiment of the present invention.

Turning now to FIG. 5, a flow chart of a maximum power point tracking method applied in the control circuit of the battery-charging device for the stand-alone generator system in accordance with the preferred embodiment of the present invention is shown. The maximum power point tracking method applied in the present invention is a duty cycle perturbation method for tracking the maximum power point of the stand-alone generator system. The duty cycle, as used herein, is the ratio of conductive time to switching period of the power electronic switch component, which is not limitative of the present invention. Referring to FIG. 5, an output voltage ($V_{source}$) and an output current ($I_{source}$) of the electrical power source 1 are retrieved to calculate a present power [$P_{source}(n)$] of the electrical power source 1 to compare with a previous power [$P_{source}(n-1)$] of the electrical power source 1 in determining a direction of the duty cycle perturbation. When the present power [$P_{source}(n)$] is greater than the previous power [$P_{source}(n-1)$], the direction of the duty cycle perturbation is correct, and there is no need to change the direction of the duty cycle perturbation, namely $D(k+1)=D(k)+\Delta D$, where $D(k)$ is the present duty cycle and $\Delta D$ is a variation of duty cycle. When the present power [$P_{source}(n)$] is less than the previous power [$P_{source}(n-1)$], the direction of the duty cycle perturbation is incorrect and there is a need of changing the direction of the duty cycle perturbation. Accordingly, $\Delta D$ multiplied by $-1$ is adopted to replace $\Delta D$, and, then, $D(k+1)=D(k)-\Delta D$ is executed. Consequently, the above-mentioned steps are repeatedly executed to track the maximum power point of the electrical power source 1, and the output power of the electrical power source 1 is perturbed around the maximum power point.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A battery-charging device for a stand-alone generator system having a MPPT function, applied to charge a battery, comprising:
   a DC/DC converter; and
   a control circuit controlling the DC/DC converter;
   wherein when a generated output power of an electrical power source of the stand-alone generator system is less than a second power limit, the control circuit controls the DC/DC converter to perform the MPPT function; when the generated output power of the electrical power source of the stand-alone generator system is lower than a first power limit, the electrical power source of the stand-alone generator system and the battery supply electric power to a load together;

wherein when the generated output power of the electrical power source of the stand-alone generator system is greater than the second power limit, but less than a third power limit, the control circuit controls the DC/DC converter to execute a pulse charging function and the MPPT function;

wherein when the generated output power of the electrical power source of the stand-alone generator system is greater than the third power limit, the control circuit controls the DC/DC converter to terminate the MPPT function and to maintain the output power of the stand-alone generator system at the third power limit to execute the pulse charging function; and wherein when a battery voltage is greater than a predetermined constant charging voltage, the control circuit controls the DC/DC converter to perform a constant voltage charging function.

2. The battery-charging device as defined in claim 1, wherein the stand-alone generator system electrically connects with the battery via the DC/DC converter, and wherein the battery supplies the electric power to the load via a switch.

3. The battery-charging device as defined in claim 1, wherein the control circuit electrically connects with the DC/DC converter such that the control circuit controls the DC/DC converter selectively being operated in the MPPT function, the pulse charging function, the constant voltage charging function or combinations thereof.

4. The battery-charging device as defined in claim 1, wherein when the generated output power of the electrical power source of the stand-alone generator system is lower than the load power, the electrical power source of stand-alone generator system and the battery supply the electric power to the load together; and wherein the control circuit controls a switch to cut off the load if the battery voltage is lower than a predetermined discharging voltage.

5. The battery-charging device as defined in claim 4, wherein the predetermined discharging voltage is a minimum discharging voltage.

6. The battery-charging device as defined in claim 1, wherein the control circuit is operated in a duty cycle perturbation method to perform the MPPT function.

7. The battery-charging device as defined in claim 6, wherein the duty cycle perturbation method comprises:
retrieving an output voltage and an output current of the electrical power source of the stand-alone generator system to calculate a present power value;
comparing the present power value with a previous power value in judging a direction of duty cycle perturbation;
wherein when the present power is greater than the previous power, the direction of the duty cycle perturbation is correct and no direction of the duty cycle perturbation is changed; and
wherein when the present power is less than the previous power, the direction of the duty cycle perturbation is incorrect and is changed.

8. A battery-charging method for a stand-alone generator system having a MPPT function comprising:
a control circuit controlling a DC/DC converter to perform the MPPT function and to provide a continuous current when a generated output power of an electrical power source of the stand-alone generator system is less than the summation of a load power and a maximum charging power of a constant current charging method for the battery;

the control circuit controlling the DC/DC converter to perform a pulse charging function and the MPPT function when the generated output power of the power source of the stand-alone generator system is greater than the summation of the load power and the maximum charging power of the constant current charging method for the battery but less than the summation of the load power and a maximum charging power of the pulse charging method for the battery;

the control circuit controlling the DC/DC converter to terminate the MPPT function when the generated output power of the electrical power source of the stand-alone generator system is greater than the summation of the load power and the maximum charging power of the pulse charging method for the battery, the generated output power of the power source of the stand-alone generator system being maintained at the summation of the load power and the maximum charging power of the pulse charging method for the battery to execute the pulse charging function; and the control circuit controlling the DC/DC converter to perform a constant voltage charging function when a battery voltage is greater than a predetermined constant charging voltage.

9. The battery-charging method as defined in claim 8, wherein the electrical power source of the stand-alone generator system electrically connects with the battery via the DC/DC converter, and wherein the battery supplies the electric power to the load via a switch.

10. The battery-charging method as defined in claim 8, wherein the control circuit electrically connects with the DC/DC converter such that the control circuit controls the DC/DC converter selectively being operated in the MPPT function, the pulse charging function, the constant voltage charging function or combinations thereof.

11. The battery-charging method as defined in claim 8, wherein when the generated output power of the power source of the stand-alone generator system is lower than the load power, the electrical power source of the stand-alone generator system and the battery supply the electric power to the load together; and wherein the control circuit controls a switch to cut off the load if the battery voltage is lower than a predetermined discharging voltage.

12. The battery-charging method as defined in claim 11, wherein the predetermined discharging voltage is a minimum discharging voltage.

13. The battery-charging method as defined in claim 8, wherein the control circuit is operated in a duty cycle perturbation method to perform the MPPT function.

14. The battery-charging method as defined in claim 13, wherein the duty cycle perturbation method comprises:
retrieving an output voltage and an output current of the electrical power source of the stand-alone generator system to calculate a present power value;
comparing the present power value with a previous power value in judging a direction of duty cycle perturbation;
wherein when the present power is greater than the previous power, the direction of the duty cycle perturbation is correct and no direction of the duty cycle perturbation is changed; and
wherein when the present power is less than the previous power, the direction of the duty cycle perturbation is incorrect and is changed.

\* \* \* \* \*